(12) United States Patent
Kakiki

(10) Patent No.: US 7,385,778 B2
(45) Date of Patent: Jun. 10, 2008

(54) CONTROL DEVICE OF STORAGE/REPRODUCTION MECHANISM

(75) Inventor: Itaru Kakiki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/526,524

(22) Filed: Sep. 25, 2006

(65) Prior Publication Data

US 2007/0268609 A1    Nov. 22, 2007

(30) Foreign Application Priority Data

May 18, 2006   (JP) ............................ 2006-138711

(51) Int. Cl.
*G11B 21/02* (2006.01)
(52) U.S. Cl. ...................................... 360/75
(58) Field of Classification Search ............... 360/75, 360/31, 46, 294.5; 374/185
See application file for complete search history.

(56) References Cited

U.S. PATENT DOCUMENTS

| | | | |
|---|---|---|---|
| 5,377,058 A | | 12/1994 | Good et al. |
| 6,101,053 A | * | 8/2000 | Takahashi ..................... 360/46 |
| 6,335,850 B1 | * | 1/2002 | Dunfield et al. ......... 360/294.5 |
| 6,538,836 B1 | * | 3/2003 | Dunfield et al. .............. 360/75 |
| 6,680,806 B2 | * | 1/2004 | Smith ........................... 360/31 |
| 6,710,952 B1 | * | 3/2004 | Smith ........................... 360/31 |
| 6,771,440 B2 | * | 8/2004 | Smith ........................... 360/31 |
| 6,999,256 B2 | * | 2/2006 | Kim et al. ..................... 360/31 |
| 7,102,838 B2 | * | 9/2006 | Kim et al. ..................... 360/31 |
| 7,212,361 B1 | * | 5/2007 | Pederson et al. ............. 360/31 |
| 7,230,781 B2 | * | 6/2007 | Ma et al. ....................... 360/31 |
| 2003/0026019 A1 | * | 2/2003 | Smith ........................... 360/31 |
| 2005/0129090 A1 | * | 6/2005 | Sheperek et al. ........... 374/185 |

FOREIGN PATENT DOCUMENTS

| | | |
|---|---|---|
| JP | 63-069075 | 3/1988 |
| JP | 6-236641 | 8/1994 |
| JP | 11-232812 | 8/1999 |
| JP | 2002-092810 | 3/2002 |
| JP | 16-079126 | 3/2004 |

* cited by examiner

*Primary Examiner*—Fred Tzeng
(74) *Attorney, Agent, or Firm*—Greer, Burns & Crain, Ltd.

(57) ABSTRACT

In order to provide a control device for a storage and reproduction mechanism that can acquire a constant error rate without being affected by changes of atmospheric pressure, a control device comprises a storage medium for storing data, a head for conducting a storage/reproduction process of data on the storage medium, an error detection unit for detecting an error of the data read by the head, and a flying height control unit for controlling a flying height of the head in accordance with the error rate for correlating changes of the flying height due to the changes in the atmospheric pressure.

12 Claims, 5 Drawing Sheets

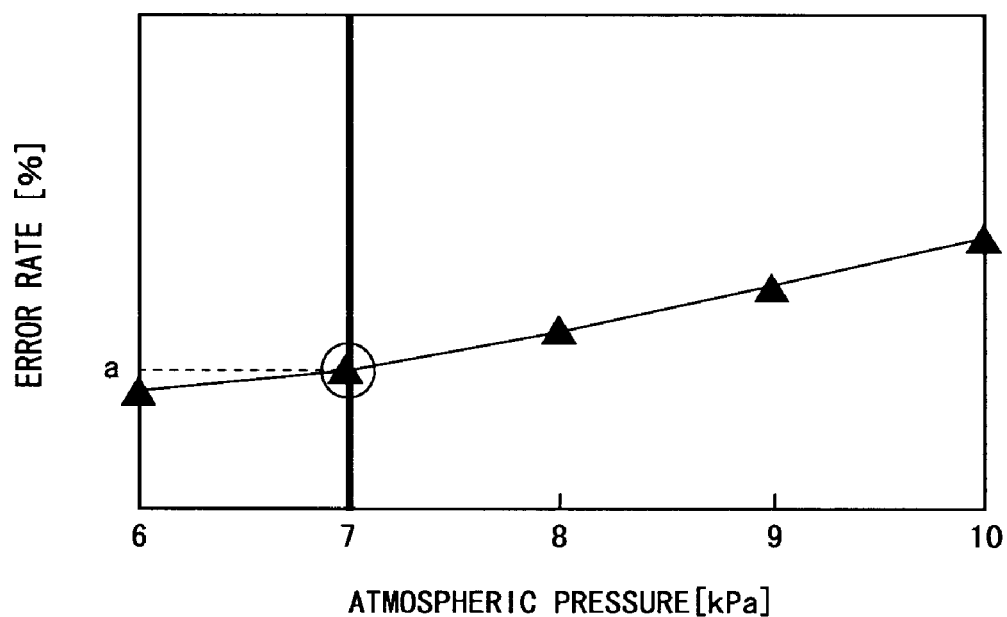
F I G. 3

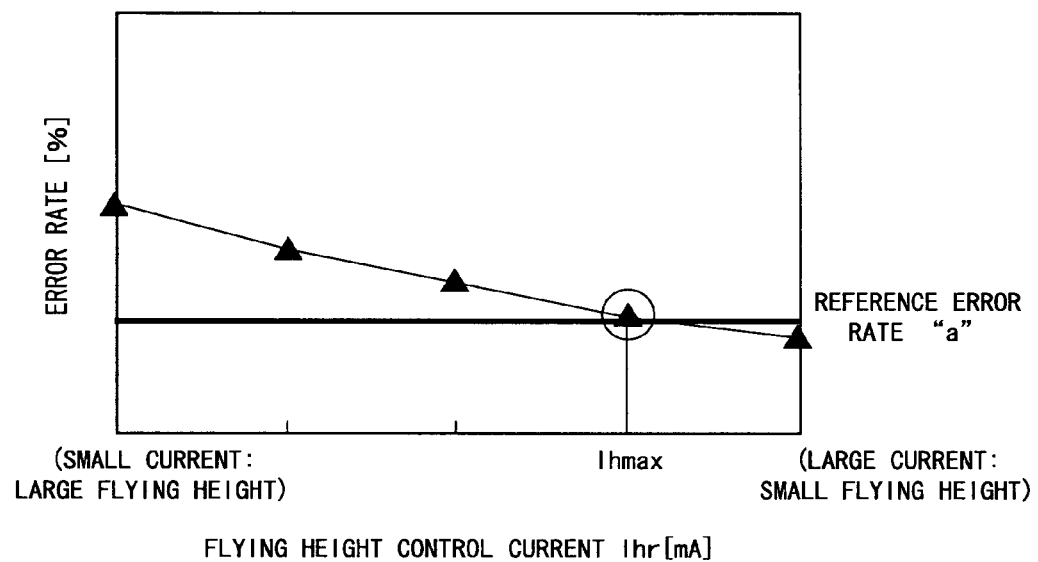
F I G. 4

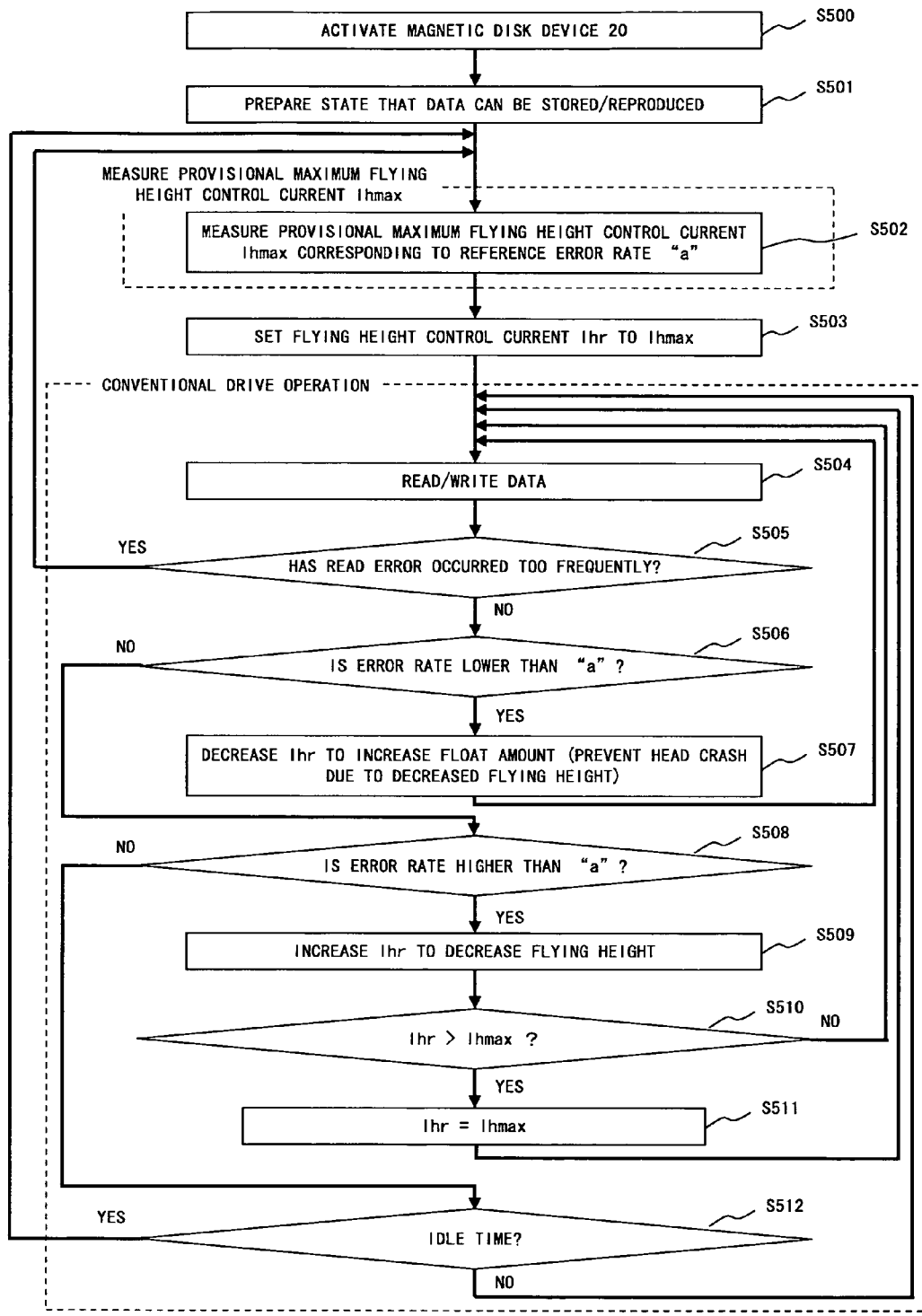
F I G. 5

CONTROL DEVICE OF STORAGE/REPRODUCTION MECHANISM

BACKGROUND OF THE INVENTION

1. Field of the Invention

The present invention relates to a control device of a mechanism that stores and/or reproduces data on a storage medium provided in a magnetic disc device or the like.

2. Description of the Related Art

Generally, a magnetic disk device is configured in such a way in which a magnetic head (swing arm) is floated by approximately 0.01 μm to 0.02 μm by means of a stream of air caused by rotating a magnetic disk at high speed.

Recently, as the density of the recording surface of magnetic disks has increased, the flying height of magnetic heads have become increasingly lower.

Accordingly, the magnetic head's flying height is now easier to affect due to changes in atmospheric pressure, temperature, or other variations. For example, when the atmospheric pressure increases, the flying height of the magnetic head also increases, and, accordingly the signal characteristic deteriorates. When the atmospheric pressure decreases, the flying height of the magnetic head decreases in response and the probability that the magnetic head touches and damages the magnetic disk is greater.

In other words, there has been a problem in which a characteristic of a signal stored and/or reproduced on the magnetic disk is affected by the changes of the atmospheric pressure, temperature, or other variables.

Japanese Patent Application Publication No. 63-069075 discloses a magnetic disk device that increases the recording surface density while reducing the risk of impact between the magnetic head and the disk by decreasing the flying height of the magnetic head only at times when data is in the process of being stored and/or reproduced.

Japanese Patent Application Publication No. 06-236641 discloses a head flying height control device that controls the flying height of the head of a disk driving mechanism by dynamically adjusting a read/write head suspension system in real time.

Japanese Patent Application Publication No. 2002-092810 discloses a magnetic disk device that improves an error recovery ratio by changing the flying height of the magnetic head in accordance with error causes.

SUMMARY OF THE INVENTION

The present invention is attained in response to the above problem, and it is an object of the present invention to provide a control device for a storage and/or reproduction mechanism that can attain constant signal quality without being affected by variations of atmospheric pressure.

In order to attain the above object, the control device according to the present invention is a control device which floats a head for conducting a storage process or a reproduction process of data on a disk-shaped storage medium by rotating the storage medium, comprising at least an error detection unit for detecting the error from data reproduced by the head and a flying height control unit for controlling the flying height of the head in accordance with the counted error rate.

According to the present invention, even when the flying height of the head changes due to changes of atmospheric pressure and the error rate changes, the flying height of the head is controlled in accordance with the error rate counted by the error detection unit. Accordingly, a constant flying height can be maintained without being affected by the change in the atmospheric pressure, such that the effect is that it is possible to attain a constant signal quality from the storage and reproduction mechanism.

As explained above, according to the present invention, it is possible to provide a control device for the storage and reproduction mechanism that can attain constant signal quality without being affected by changes of atmospheric pressure.

BRIEF DESCRIPTION OF THE DRAWINGS

FIG. 3 explains a reference error rate used for a flying height control of the magnetic disk device according to an embodiment of the present invention;

FIG. 4 explains a relationship between an error rate and a flying height control current Ihr used for the flying height control of the magnetic disk device according to an embodiment of the present invention; and FIG. 5 is a flowchart showing a control process of the flying height of the magnetic disk device according to an embodiment of the present invention.

DESCRIPTION OF THE PREFERRED EMBODIMENTS

Herein below, embodiments of the present invention will be explained, by referring to FIG. 1 to FIG. 5.

Figure 1:
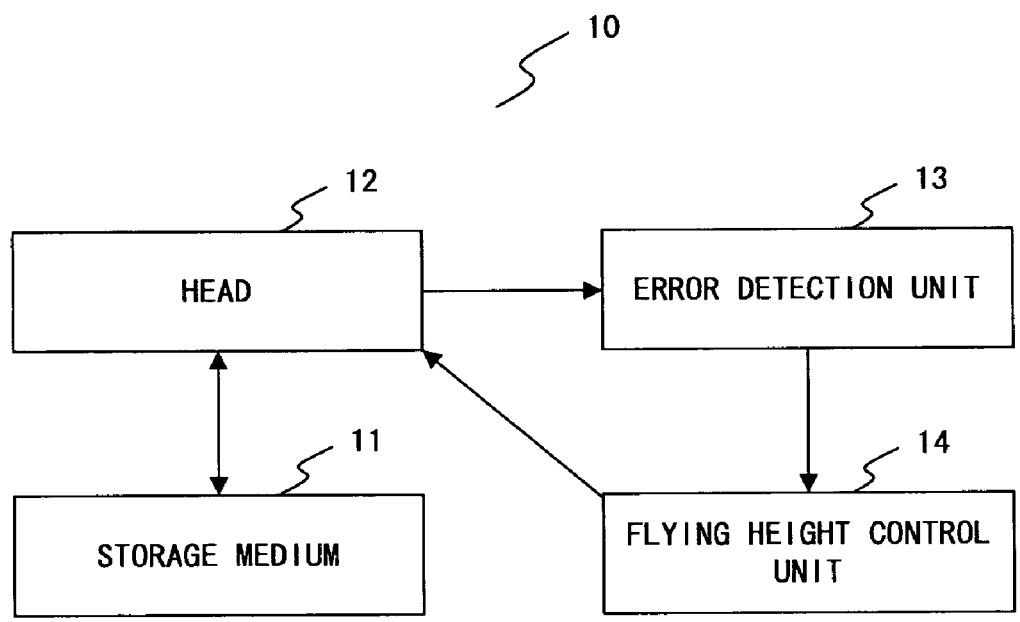
FIG. 1 explains an outline of a control device according to an embodiment of the present invention.

FIG. 1 explains an outline of a control device 10 according to an embodiment of the present invention.

As shown in FIG. 1, the control device 10 according to the present embodiment comprises at least a storage medium 11 for storing data, a head 12 for conducting storage/reproduction processes of data on the storage medium 11, an error detection unit 13 for counting an error of data read by the head 12, a flying height control unit 14 for controlling a flying height of the head 12 in accordance with the error rate.

The storage medium 11 is, for example, a magnetic disk of the storage medium used in a magnetic disk device.

The head 12 conducts storage (write)) and reproduction (read) processes on data in the storage medium 11 while maintaining a distance (flying height) which is larger than a prescribed distance to the storage medium 11. For example, when the storage medium 11 is a magnetic disk, the head 12 is floated with a distance larger than the prescribed distance by a stream of air caused by rotating the storage medium 11 at high speed.

The error detection unit 13 counts the error from data reproduced by the head 12. For example, the error detection unit 13 counts the error by detecting errors in data from ECC (Error Correcting Code) assigned to reproduced data.

The flying height control unit 14 compares the error rate counted by the error detection unit 13 with a predetermined error rate as reference (hereinafter referred to as "reference error rate"), and adjusts the flying height of the head 12 in accordance with the difference between the two.

Figure 2:
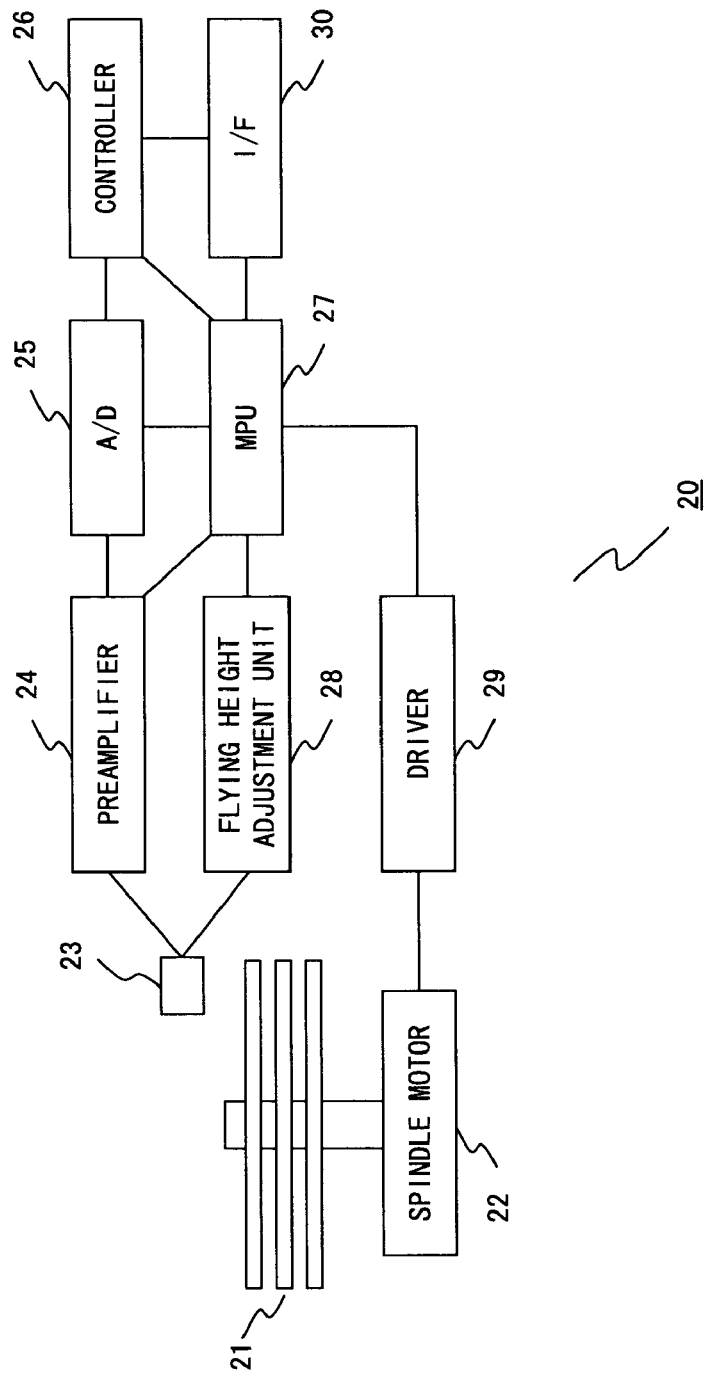
FIG. 2 shows a configuration example of a magnetic disk device according to an embodiment of the present invention.

FIG. 2 shows a configuration example of a magnetic disk device 20 according to an embodiment of the present invention.

The magnetic disk device 20 shown in FIG. 2 comprises at least one or more magnetic disks 21, a spindle motor 22 for rotating the magnetic disk 21 at prescribed speed, a magnetic head 23 for conducting storage and reproduction processes on data in the magnetic disk 21, a preamplifier 24 for amplifying the signal read by the magnetic head 23 to a prescribed level, an A/D converter 25 for digitizing the signal read by the magnetic head 23, a controller 26 for detecting the data error by using the ECC assigned to the digitized data and calculating an error rate, a MPU (Micro Processing Unit) 27 for controlling the entirety of the magnetic disk device 20, a flying height adjustment unit 28 for adjusting the flying height of the magnetic head 23 in accordance with the instruction of the MPU 27, a driver 29 for driving the spindle motor 22 in accordance with the instruction of the MPU 27, and an I/F 30 which interfaces with the device connected to the magnetic disk device 20.

When the magnetic disk 21 is rotated at high speed the magnetic head 23 is floated above the magnetic disk 21 by the stream of air caused by the rotation. Then, the magnetic head 23 reads the data stored on the magnetic disk 21, and outputs the read contents to the preamplifier 24.

The signal, which has been amplified to the prescribed level by the preamplifier 24, is digitized by the A/D converter 25 and input to the controller 26. The controller 26 detects data error by using the ECC assigned to the input data and counts the error. In the present embodiment, the percentage (%) of erroneous data to the entire data read is used as the error rate.

The data output from the controller 26 is output to an external device via the I/F 30.

The MPU 27 calculates an adjustment amount on the magnetic disk 21 based on the difference between the reference error rate and the error rate counted by the controller 26, and gives an instruction to the flying height adjustment unit 28.

The flying height adjustment unit 28 floats the magnetic disk 21 by the adjustment amount instructed from the MPU 27. For example, the flying height adjustment unit 28, according to the present embodiment, provides a heat source in the vicinity of the storage reproduction element of the magnetic head and adjusts the flying height through thermal expansion of the storage reproduction element caused by heating it. An electric current controls the heating by the heat source. Hereinafter, this electric current is referred to as a flying height control current Ihr. It is to be noted that the method of adjusting the flying height of the magnetic disk 21 through thermal expansion is a conventional method; accordingly, detailed explanations thereof are omitted.

In the above configuration, the storage medium 11 and the head 12 shown in FIG. 1 correspond respectively to the magnetic disk 21 and magnetic head 23. Also, the error detection unit 13 and the flying height control unit 14 correspond respectively to the controller 26 and flying height adjustment unit 28.

FIG. 3 explains the reference error rate used for the flying height control of the magnetic disk device 20 according to an embodiment of the present invention.

In the present embodiment, in order to acquire the reference error rate, the error rates of the magnetic disk device 20 at various altitudes (atmospheric pressures) are measured. FIG. 3 is a graph showing results of the measurements of the error rates at 6 [kPa], 7 [kPa], 8 [kPa], 9 [kPa], and 10 [kPa].

The magnetic disk device 20, according to the present embodiment, guarantees operation at an altitude equal to or lower than three thousand meters above sea level. The atmospheric pressure at the altitude of three thousand meters above sea level is 7 [kPa]; accordingly, it is assumed that the error rate "a" at the altitude of 7 [kPa] is the reference error rate.

FIG. 4 explains the relationship between the error rate and the flying height control current Ihr used for the flying height control of the magnetic disk device 20 according to an embodiment of the present invention.

The graph of FIG. 4 shows error rate characteristics based on the measurement results of the error rates with various flying height. The flying height is determined by the flying height control current Ihr, thus, the horizontal axis represents the flying height control current Ihr.

As shown in FIG. 4, when the flying height control current Ihr becomes larger, the heat source in the vicinity of the storage reproduction element of the magnetic head 23 is heated, and the storage reproduction element is expanded due to the heat; accordingly, the flying height of the magnetic head 23 becomes smaller. As a result of this, the error rate becomes lower.

When the flying height control current Ihr becomes smaller, the heat quantity of the heat source in the vicinity of the storage reproduction element of the magnetic head 23 becomes smaller, and the storage reproduction element is less expanded; accordingly, the flying height of the magnetic head 23 becomes larger. As a result of this, the error rate becomes higher.

FIG. 5 is a flowchart showing a control process of the flying height of the magnetic disk device 20 according to an embodiment of the present invention.

When the magnetic disk device 20 is turned on, the magnetic disk device 20 is activated, and the process proceeds to a step S501. Then, in the step S501, the magnetic disk device 20 floats the magnetic head 23 by rotating the magnetic disk 21 at the prescribed speed in order to prepare the state in which data can be stored and reproduced on the magnetic disk 21.

In step S502, the magnetic disk device 20 reads data stored beforehand on a cylinder on the magnetic disk 21, which is used only for a flying height measurement, and counts the error rate. Hereinafter, the above cylinder and the above data are respectively referred to as "flying height measurement cylinder" and "flying height measurement data".

Then, the magnetic disk device 20 adjusts the flying height control current Ihr such that the counted error rate corresponds to the reference error rate "a" explained in FIG. 3. Hereinafter, the above adjusted flying height control current is referred to as "provisional maximum flying height control current Ihmax".

When the adjustment is completed, the magnetic disk device 20 stores the provisional maximum flying height control current Ihmax on memory (or similar devices) and the process proceeds to step S503.

In step S503, the magnetic disk device 20 sets (fixes) the flying height control current Ihr to the provisional maximum flying height control current Ihmax. In other words, the flying height of the magnetic head 23 above the magnetic disk 21 is fixed.

In step S504, the magnetic disk device 20 conducts storage/reproduction processes of data on the magnetic disk 21 in accordance with the instruction from an information-processing device or the like connected to the magnetic disk device 20. In other words, the magnetic disk device 20 conducts read/write processes of data on the magnetic disk 21.

Also, when retry processes are conducted (because of failures in reading of data from the magnetic disk 21) the magnetic disk device 20 counts the number of retry processes conducted.

Further, the magnetic disk device 20 detects data errors from the ECC assigned to the data read by the reproduction process on the magnetic disk 21 and calculates the error rate.

In step S505, the magnetic disk device 20 checks whether or not the number of the retry processes counted in the step S504 is equal to or larger than the prescribed number. When the number of the retry processes is equal to or larger than the prescribed number, the magnetic disk device 20 determines that the read error has occurred too frequently. Then, the process returns to step S502, and the measurement of the provisional maximum flying height control current Ihmax is conducted again.

However, when it is determined that the read error has not occurred too frequently in the step S505, the process proceeds to step S506.

In step S506, the magnetic disk device 20 compares the error rate calculated in the step S504 with the reference error rate "a". Then, if the error rate calculated in the step S504 is lower than the reference error rate "a", it is determined that the flying height of the magnetic head 23 above the magnetic disk 21 is getting smaller, and the process proceeds to step S507. The magnetic disk device 20 then increases the flying height of the magnetic head 23 by decreasing the flying height control current Ihr.

It is possible to prevent a head crash caused by a touch between the magnetic disk 21 and the magnetic head 23 due to a decreased flying height of the magnetic head 23.

In the step S506, when the error rate calculated in the step S504 is not lower than the reference error rate "a", the magnetic disk device 20 causes the process to proceed to step S508.

In step S508, the magnetic disk device 20 compares the error rate calculated in the step S504 with the reference error rate "a". When the error rate calculated in the step S504 is higher than the reference error rate "a" (i.e., when the error rate has risen), the process proceeds to step S509.

In step S509, the magnetic disk device 20 decreases the flying height of the magnetic head 23 by increasing the flying height control current Ihr.

In step S510, the magnetic disk device 20 compares the flying height control current Ihr and the provisional maximum flying height control current Ihmax.

When the flying height control current Ihr is equal to or lower than the provisional maximum flying height control current Ihmax, the magnetic disk device 20 causes the process to return to step S504.

When the flying height control current Ihr is higher than the provisional maximum flying height control current Ihmax, the magnetic disk device 20 causes the process to proceed to step S511. Then, the flying height control current Ihr is set to the provisional maximum flying height control current Ihmax, and the process returns to step S504.

In step S508, when the error rate calculated in step S504 is not higher than the reference error rate "a", (i.e., when the error rate has not risen), the process proceeds to step S512.

In step S512, the magnetic disk device 20 checks whether or not the current time is an idle time. For example, if a storage and reproduction process is not conducted on the magnetic disk 21 during a prescribed period, that period of time is determined to be idle time. When that period of time is determined to be idle time, the process returns to step S502. When that period of time is determined not to be idle time, the process returns to the step S504.

As explained above, by constantly measuring the error rate and controlling the flying height such that the measured error rate is always equal to the reference error rate, it is possible to prevent deterioration of signal characteristics caused by changes of the flying height due to changes in atmospheric pressure.

In other words, it is possible to control the magnetic head (the storage and reproduction mechanism) so as to attain a constant character quality without being affected by changes of the atmospheric pressure. As a result of this, the number of retry processes of the magnetic disk device is reduced such that the read and write processes of data can be accelerated.

It is also possible to prevent a crash caused by the magnetic head and the magnetic disk touching one another due to the flying height decreasing due to the lowered atmospheric pressure.

Furthermore, the present invention can be realized simply by adding a process of controlling the flying height (flying height control current) by calculating the error rate from the signal reproduced by the magnetic head; accordingly, it is possible to easily realize control of the flying height according to the present invention using a conventional circuit configuration (i.e., without adding a specialized circuit).

In the above explanation, the present invention has been explained using examples of magnetic disk device 20. However, the scope of the present invention is not limited to these examples. The same effect as in the above embodiments can be attained by applying the present invention to any storage device that employs a method in which mechanism conducting storage and reproduction processes of data on a storage medium is floated by means of rotating the storage medium at high speed or similar methods.

What is claimed is:

1. A control device that floats a head for conducting a storage process or a reproduction process of data on a disk-shaped storage medium by rotating the storage medium, comprising at least:
    an error detection unit for detecting an error from data reproduced by the head; and
    a flying height control unit for controlling a flying height of the head in accordance with the detected error rate,
    wherein the control unit compares a predetermined reference error rate determined in accordance with a desired atmospheric pressure with the error detected by the error detection unit, determines an adjustment amount of the flying height of the head in accordance with a result of the comparison, and adjusts the flying height of the head by the determined adjustment amount.

2. The control device according to claim 1, wherein the predetermined reference error rate is measured at a desired atmospheric pressure.

3. The control device according to claim 1, wherein the desired atmospheric pressure is an atmospheric pressure to guarantee operation.

4. The control device according to claim 1, wherein:
    the flying height control unit controls the flying height of the head by changing a flying height control current,
    the flying height control current is decreased when the detected error rate is smaller than the predetermined reference error rate, and
    the flying height control current is increased when the detected error rate is larger than the predetermined reference error rate.

5. A storage device including a control device that floats a head for conducting a storage process or a reproduction process of data on a disk-shaped storage medium by rotating the storage medium, comprising at least:

an error detection unit for detecting an error from data reproduced by the head; and a flying height control unit for controlling a flying height of the head in accordance with the detected error rate, wherein the control unit compares a predetermined reference error rate determined in accordance with a desired atmospheric pressure with the error detected by the error detection unit, determines an adjustment amount of the flying height of the head in accordance with a result of the comparison, and adjusts the flying height of the head by the determined adjustment amount.

6. The storage device according to claim 5, wherein the predetermined reference error rate is measured at a desired atmospheric pressure.

7. The storage device according to claim 5, wherein the desired atmospheric pressure is an atmospheric pressure to guarantee operation.

8. The storage device according to claim 5, wherein:

the flying height control unit controls the flying height of the head by changing a flying height control current, the flying height control current is decreased when the detected error rate is smaller than the predetermined reference error rate, and the flying height control current is increased when the detected error rate is larger than the predetermined reference error rate.

9. A control method of floating a head for conducting a storage process or a reproduction process of data on a disk-shaped storage medium by rotating the storage medium, causing a storage device to conduct:

an error detection process of detecting an error from data reproduced by the head; and a flying height control process of controlling a flying height of the head in accordance with the detected error rate, wherein the control process compares a predetermined reference error rate determined in accordance with a desired atmospheric pressure with the error detected by the error detection process, determines an adjustment amount of the flying height of the head in accordance with a result of the comparison, and adjusts the flying height of the head by the determined adjustment amount.

10. The control method according to claim 9, wherein the predetermined reference error rate is measured at a desired atmospheric pressure.

11. The control method according to claim 9, wherein the desired atmospheric pressure is an atmospheric pressure to guarantee operation.

12. The control method according to claim 9, wherein:

The flying height control process is a process of changing a flying height control current, the flying height control current is decreased when the detected error rate is smaller than the predetermined reference error rate, and the flying height control current is increased when the detected error rate is larger than the predetermined reference error rate.

* * * * *